US006586523B1

(12) United States Patent
Blum et al.

(10) Patent No.: US 6,586,523 B1
(45) Date of Patent: Jul. 1, 2003

(54) SELF-CROSSLINKING POLYURETHANE, POLYURETHANE POLYUREA OR POLYUREA DISPERSIONS FOR SIZING AGENTS

(75) Inventors: Harald Blum, Leverkusen (DE); Karin Naujoks, Burscheid (DE); Eberhard König, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/937,835

(22) PCT Filed: Mar. 21, 2000

(86) PCT No.: PCT/EP00/02486

§ 371 (c)(1), (2), (4) Date: Sep. 28, 2001

(87) PCT Pub. No.: WO00/59973

PCT Pub. Date: Oct. 12, 2000

(30) Foreign Application Priority Data

Apr. 1, 1999 (DE) ........................................ 199 14 882

(51) Int. Cl.[7] ................................................ C08G 18/80

(52) U.S. Cl. ....................... 524/840; 524/591; 524/839; 428/364; 428/378; 427/389.7

(58) Field of Search ................................ 524/591, 840, 524/839; 428/364, 378; 427/389.7

(56) References Cited

U.S. PATENT DOCUMENTS

| | | | | |
|---|---|---|---|---|
| 4,108,814 A | | 8/1978 | Reiff et al. | 260/29.2 TN |
| 4,255,317 A | | 3/1981 | Coakley et al. | 260/37 |
| 4,310,646 A | * | 1/1982 | Kempter et al. | |
| 4,387,181 A | | 6/1983 | Brown et al. | 524/714 |
| 4,764,553 A | * | 8/1988 | Mosbach et al. | |
| 5,300,556 A | | 4/1994 | Tirpak et al. | 524/591 |
| 5,563,208 A | | 10/1996 | König et al. | 524/591 |
| 5,738,912 A | * | 4/1998 | Konig et al. | |
| 5,804,647 A | | 9/1998 | Nachtkamp et al. | 524/591 |
| 5,922,806 A | | 7/1999 | Blum et al. | 524/591 |
| 6,031,028 A | * | 2/2000 | Iino et al. | |

FOREIGN PATENT DOCUMENTS

| | | |
|---|---|---|
| DE | 25 53 839 | 12/1976 |
| DE | 36 41 494 | 6/1988 |
| EP | 0 784 097 | 7/1997 |
| WO | 93/24550 | 12/1993 |

* cited by examiner

*Primary Examiner*—Rachel Gorr
(74) *Attorney, Agent, or Firm*—Joseph C. Gil; John E. Mrozinski, Jr.

(57) ABSTRACT

The invention relates to self-crosslinking polyurethane, polyurethane-polyurea or polyurea dispersions, a process for the preparation of such dispersions and the use thereof.

20 Claims, No Drawings

SELF-CROSSLINKING POLYURETHANE, POLYURETHANE POLYUREA OR POLYUREA DISPERSIONS FOR SIZING AGENTS

FIELD OF THE INVENTION

The invention relates to self-crosslinking polyurethane, polyurethane-polyurea or polyurea dispersions, a process for the preparation of such dispersions, and to the use thereof.

BACKGROUND OF THE INVENTION

The use of polyurethane dispersions, e.g., for the preparation of glass fibre sizes is known, e.g., from U.S. Pat. No. 4,255,317. Similarly, the use of hardener components based on blocked polyisocyanates in combination with polyurethane dispersions is known, e.g., from EP-A 792 900. Self-crosslinking dispersions are not described therein.

Aqueous PU dispersions with isocyanate groups blocked with butanone oxime and with diamine mixed in, e.g., isophorone diamine, are described in U.S. Pat. No. 4,387,181, but not the use of said dispersions as size. Rather, a special preparation process is described wherein the dispersion, which contains the blocked isocyanate groups, undergoes chain extension, e.g., for 12 hours at 70° C. by reaction with the diamine. High molecular weight dispersions are thereby obtained in which no subsequent crosslinking is possible. The dispersions are less suitable for use in glass fibre sizes.

Paint dispersions are described in U.S. Pat. No. 5,563,208, wherein curing is carried out with a polyamine on the substrate. Relatively low molecular weight prepolymers with blocked isocyanate groups in an approximately trifunctional structure are described here, this being substantiated by the use of the polyisocyanates used by way of example such as crude MDI or isocyanurate group-containing paint polyisocyanates based on 1,6-diisocyanatohexane. No indication is given of the suitability of such products for sizes. In view of the considerable branching and high crosslinking density, the products are unsuitable for sizes and the reinforcing properties are insufficient.

U.S. Pat. No. 5,300,556 describes a process for the preparation of aqueous dispersions containing blocked polyisocyanates and polyhydroxyl compounds. A hydrophilic polyisocyanate is reacted with blocking agent in the presence of polyhydroxyl compounds in aqueous dispersion. It is necessary in this case to use blocking agents which have a greater reactivity than water and the polyhydroxyl compound. This means the opportunities for improvement are considerably restricted and also makes implementation on an industrial scale extremely difficult since an isocyanate-water reaction can never be ruled out altogether. Similarly, no indication of the suitability of such products for sizes is given.

SUMMARY OF THE INVENTION

Surprisingly, it has now been found that glass fibre sizes containing special self-crosslinking polyurethane, polyurethane-polyurea or polyurea dispersions exhibit markedly improved processability with sized glass fibres and improved mechanical properties of corresponding glass fibre-reinforced plastics.

The term self-crosslinking dispersions means those dispersions that contain polyurethanes, polyurethane-polyureas or polyureas with blocked isocyanate groups and reactive hydroxyl or amino groups in the same polymer and/or blocked isocyanate groups in the polymer and, in addition, diamines, polyamines and/or hydroxyamines. The presence of blocked isocyanate groups and reactive hydroxyl or amino groups in the same monomer leads, surprisingly, to improved properties as regards reinforcing properties and resistance to hydrolysis, and the processing properties such as, e.g., bulk density.

It was also found that such dispersions also offer some other advantages for the user. The expense of the separate storage of dispersion and hardener is dispensed with, problems or inadequate size properties which may arise due to inaccurate mixing of dispersion and hardener are avoided. No compatibility problems arise of the kind that can occur between different dispersions and hardeners either during the mixing stage or during the elevated temperatures during application.

The invention provides, therefore, self-crosslinking dispersions based on polyurethanes, polyurethane-polyureas or polyureas which contain blocked isocyanate groups bound to the polymer and, also bound to the polymer, reactive hydroxyl or amino groups and/or up to 10 wt. % of a reactive component comprising at least one diamine, polyamine or hydroxyamine having a molecular weight from 60 to 1000, are stable in storage up to 50° C. and react at 90 to 280° C. with crosslinking.

DETAILED DESCRIPTION OF THE INVENTION

For the sake of simplicity, the polyurethane, polyurethane-polyurea or polyurea dispersions according to the invention are also referred to below as polyurethane dispersions or as dispersions, in which case polyurethane, polyurethane-polyurea and polyurea dispersions are always included. The term dispersion also includes dispersions which contain dissolved polymer proportions. The proportion of dissolved polymers may be influenced, e.g., by the content of hydrophilic components.

The self-crosslinking dispersions according to the invention based on polyurethanes, polyurethane-polyureas or polyureas are reaction products, present in the dispersed or dissolved form, of a) at least one polyol component, b) at least one di-, tri- and/or polyisocyanate component, c) at least one hydrophilic, nonionic or (potentially) ionic structural component comprising compounds with at least one group which is reactive towards isocyanate groups and at least one hydrophilic polyether chain, and/or compounds with at least one group capable of salt formation optionally present at least in the partially neutralised form, and at least one group which is reactive towards isocyanate groups, d) at least one structural component which is different from a) to c) having a molecular weight from 32 to 500 with at least one group which is reactive towards isocyanate groups, and e) at least one monofunctional blocking agent, wherein c) is used in a quantity such that a stable dispersion is obtained, wherein either a component d) is used in such a way that the resulting dispersion contains, in addition to blocked isocyanate groups, reactive free hydroxyl and/or amino groups, and/or wherein a component F) comprising at least one reactive diamine, polyamine and/or hydroxyamine is contained in the resulting dispersion, wherein the proportion of reactive hydroxyl or amino groups from d) and/or F) may not be 0.

The dispersions according to the invention based on polyurethanes, polyurethane-polyureas or polyureas are preferably reaction products of a) 30 to 90 wt. % of at least one polyol component having a hydroxyl value from 5 to 350, b) 10 to 50 wt. % of at least one di-, tri- and/or polyisocyanate component, c) 1 to 20 wt. % of at least one hydrophilic, nonionic or (potentially) ionic structural component comprising compounds with at least one group which is reactive towards isocyanate groups and at least one group capable of salt formation optionally present at least in the partially neutralised form, or a hydrophilic polyether chain, d) 1 to 20 wt. % of at least one structural component different from a) to c) having a molecular weight from 32 to 500 with at least one group which is reactive towards isocyanate groups, e) 0.2 to 7.5 wt. % of at least one monofunctional blocking agent, wherein c) is used in a quantity such that a stable dispersion is obtained, wherein either a component d) is used in such a way that the resulting dispersion contains, in addition to blocked isocyanate groups, reactive free hydroxyl and/or amino groups in quantities from 0 to 4 wt. % based on the solids content of the dispersion, and/or wherein 0 to 10 wt. %, based on the solids content of the dispersion, of a component F) comprising at least one reactive diamine, polyamine and/or hydroxyamine are contained in the resulting dispersion, wherein the proportion of reactive hydroxyl or amino groups from d) and/or F) may not be 0.

Particularly preferred dispersions according to the invention based on polyurethanes, polyurethane-polyureas or polyureas are reaction products of a) 35 to 75 wt. % of at least one polyol component having a hydroxyl value from 5 to 350, b) 15 to 40 wt. % of at least one diisocyanate component, c) 2.5 to 15 wt. % of a hydrophilic nonionic compound with at least one group which is reactive towards isocyanate groups and a hydrophilic polyether chain and also a further (potentially) anionic compound with a group capable of salt formation optionally present at least in the partially neutralised form, d) 1 to 11 wt. % of at least one structural component different from a) to c) having a molecular weight from 32 to 500 with at least one group which is reactive towards isocyanate groups, and e) 0.2 to 6 wt. % of blocking agent, wherein the sum of a) to e) is 100%, wherein c) is used in a quantity such that a stable dispersion is obtained and wherein a component d) is used in such a way that the resulting dispersion contains, in addition to blocked isocyanate groups, reactive free hydroxyl and/or amino groups in quantities from 0 to 2.5 wt. % based on the solids content of the dispersion, and/or wherein 0 to 6 wt. %, based on the solids content of the dispersion, of a component F) comprising at least one reactive diamine, polyamine and/or hydroxyamine are contained in the resulting dispersion, wherein the proportion of reactive hydroxyl or amino groups from d) and/or F) may not be 0.

The invention also provides a process for the preparation of self-crosslinking dispersions, characterised in that an isocyanate-functional prepolymer is prepared in the first instance from at least one polyol a), at least one isocyanate component b), optionally with the use of hydrophilic components c) or components d), then a part of the remaining isocyanate groups is reacted with at least one blocking agent e) and then the other isocyanate groups are reacted either before, during or after dispersion optionally with hydrophilic components c) and/or components d), then the solvent optionally added before, during or after prepolymer preparation is optionally removed by distillation, wherein the hydrophilic component(s) c) are used in a quantity such that a stable dispersion is obtained and wherein a component d) is used in such a way that, in addition to blocked isocyanate groups, free reactive hydroxyl and/or amino groups are bound to the polymer in the self-crosslinking dispersion.

The invention also provides a further process for the preparation of self-crosslinking dispersions, characterised in that an isocyanate-functional prepolymer is prepared in the first instance from at least one polyol a), at least one isocyanate component b), optionally with the use of hydrophilic components c) or components d), then a part of the remaining isocyanate groups is reacted with at least one blocking agent e) and then the other isocyanate groups are reacted either before, during or after dispersion optionally with hydrophilic components c) and/or components d), and wherein a reactive component F) is added before, during or after dispersion when no more free isocyanate groups are present, and then the solvent optionally added before, during or after prepolymer preparation is removed by distillation, so that, in addition to blocked isocyanate groups, optionally free reactive hydroxyl and/or amino groups are bound to the polymer in the self-crosslinking dispersion and reactive amino and/or hydroxyl groups are contained in the form of diamines, polyamines or hydroxyamines.

The invention also provides the use of self-crosslinking polyurethane dispersions in or as sizes, particularly for glass fibres.

Polyol components a) suitable for the preparation of the dispersions according to the invention are, e.g., polyester polyols (e.g. Ullmanns Encyclopaedia of industrial chemistry, 4th ed., vol. 19, p. 62–65). Suitable raw materials for the preparation of said polyester polyols are difunctional alcohols such as ethylene glycol, 1,2- and 1,3-propylene glycol, butane 1,3-, 1,4-, 2,3-diol, hexane 1,6-diol, neopentylglycol, tri-methylhexane diol, triethylene glycol, hydrogenated bisphenols, trimethylpentane diol, diethylene diglycol, dipropylene diglycol, cyclohexane 1,4-diol, 1,4-cyclo-hexane dimethanol and difunctional carboxylic acids and the anhydrides thereof such as adipic acid, phthalic acid (anhydride), isophthalic acid, maleic acid (anhydride), terephthalic acid, tetrahydrophthalic acid (anhydride), hexahydrophthalic acid (anhydride), succinic acid (anhydride), fumaric acid, azelaic acid, dimer fatty acid. Polyester raw materials also suitable are monocarboxylic acids such as benzoic acid, 2-ethylhexanoic acid, oleic acid, soya oil fatty acid, stearic fatty acid, groundnut oil fatty acid, linseed oil fatty acid, nonanoic acid, cyclohexane monocarboxylic acid, isononanoic acid, sorbic acid, conjuene fatty acids, higher functionality carboxylic acids or alcohols such as trimellitic acid (anhydride), butane tetracarboxylic acid, trimer fatty acid, trimethylolpropane, glycerine, pentaerythritol, castor oil, dipentaerythritol and other polyester raw materials not mentioned by name.

Polyol components a) also suitable are polycarbonate diols which may be obtained, e.g., by reaction of diphenyl or dimethylcarbonate with low molecular weight diols or triols or epsilon caprolactone-modified diols or triols.

Polyester diols based on lactone are also suitable, these being homo- or copolymers of lactones, preferably addition products of lactones having terminal hydroxyl groups such as, e.g., epsilon caprolactone or gamma butyrolactone on difunctional starter molecules. Suitable starter molecules may be the above-mentioned diols or low molecular weight polyester or polyether diols. The corresponding hydroxycarboxylic acids may also be used instead of the polymers of lactones.

Polyol components a) also suitable are polyether polyols. They may be obtained in particular by polymerisation of ethylene oxide, propylene oxide, tetrahydrofuran, styrene oxide and/or epichlorohydrin with themselves, e.g., in the presence of BF3 or basic catalysts, or by addition of said compounds optionally also in mixture or successively to starter components with reactive hydrogen atoms such as alcohols, amines, aminoalcohols or water.

The polyol components a) mentioned may also be used as mixtures, optionally also together with other polyols a) such as, e.g., polyester amides, polyether esters, polyacrylates, polyols based on epoxide.

The hydroxyl value of the polyols a) is 5 to 350, preferably 8 to 200 mg KOH/g of substance. The molecular weights of the polyols a) are between 300 and 25000, preferably between 300 and 15000, polyols a) with a molecular weight of >9000 g/mole being used at least partially in a preferred embodiment.

Components a) used in particular preference are polyols resistant to hydrolysis having a molecular weight from 300 to 3500 based on carbonate diols, tetrahydrofuran diols and/or di- or trifunctional polyethers based on propylene oxide or propylene oxide/ethylene oxide, where, if trifunctional polyethers are used, these are used at most in quantities of up to 8 wt. % based on the total solids content of the polymer.

In a particularly preferred embodiment, component a) is used in quantities from 37 to 49 wt. %.

The total proportion of trifunctional or—less preferably—higher functionality components a) to F) is 0 to 8, preferably 0 to 5.5 wt. %, based on the total solids content of the polymer.

Component b) is composed of at least one organic di-, tri- or polyisocyanate having a molecular weight from 140 to 1500, preferably 168 to 262. Suitable examples are hexamethylene diisocyanate (HDI), isophorone diisocyanate (IPDI), 4,4'-diiso-cyanatodicyclohexylmethane (H12MDI), 1,4-butane diisocyanate, hexahydrodiiso-cyanatotoluene, hexahydrodiisocyanatoxylene, nonanetriisocyanate. Aromatic isocyanates such as 2,4- or 2,6-diisocyanatotoluene (TDI), xylylene diisocyanate and 4,4'-diisocyanatodiphenylmethane are suitable in principle but not preferred. Inherently known polyisocyanates based on the above mentioned and other isocyanates with uretdione, biuret, allophanate, isocyanurate, iminoxadiazine dione or urethane structural units may also be used, but this is not preferred.

The exclusive use of aliphatic or cycloaliphatic difunctional isocyanates having a molecular weight from 168 to 222, particularly isophorone diisocyanate and/or hexamethylene diisocyanate is particularly preferred.

Component c) is composed of at least one (potentially) ionic compound with at least one group which is reactive towards isocyanate groups and/or at least one nonionic compound with hydrophilic polyether groups and at least one group which is reactive towards isocyanate groups. The ionic compounds are, e.g. carboxylic acid, sulfonic acid and phosphoric acid having at least one, preferably one or two hydroxyl and/or primary or secondary amino groups, or the salts thereof. Suitable acids are, e.g., hydroxypivalic acid, dimethylol acetic acid, 2,2'-dimethylolpropionic acid, 2,2'-dimethylolbutyric acid, aminobenzoic acid, 2,2'-dimethylolpentanoic acid, addition products of acrylic acid and diamines such as, e.g., ethylene diamine or isophorone diamine. The use of sulfonate diols optionally having ether groups of the kind mentioned in U.S. Pat. No. 4,108,814 is also suitable. Aminofunctional sulfonates are also suitable.

Also suitable but less preferred are (potentially) cationic compounds with at least one hydroxyl and/or primary or secondary amino group and at least one tertiary amino group or the salts thereof with carboxylic, sulfonic or phosphoric acid.

The free acid or amino groups, particularly carboxyl and sulfonic acid groups are the above-mentioned "potentially ionic or anionic" groups whilst the salt-like groups obtained by neutralisation with bases or acids, particularly carboxylate groups and sulfonate groups, are the above-mentioned "ionic or anionic" groups.

In particularly preferred embodiments, anionic components c) are composed of compounds containing sulfonate groups or of the addition product of equivalent amounts of acrylic acid and isophorone diamine.

Favourable compatibility, a reduced crystallisation tendency of the polymer and improved application properties are obtained due to the cycloaliphatic group of said carboxylate hydrophilic agent. The sulfonate groups also improve the compatibility with other binder components and have a positive effect on the resistance to hydrolysis and altogether improve the stability of the sizes.

Nonionic hydrophilic compounds c) are contained as an imperative, and have, per molecule, one or two groups which are reactive towards isocyanate groups, particularly hydroxyl and/or primary or secondary amino groups and at least one hydrophilic polyether chain. 30% to 100% of the polyether chains of said compounds are composed of incorporated ethylene oxide units, in a preferred embodiment 40 to 95% incorporated ethylene oxide units in addition to 5 to 60% incorporated propylene oxide units being present. Suitable components c) of such kind have molecular weights from 300 to 6000 and are, e.g., monofunctional polyethylene/-propylene glycol monoalkylethers such as Breox® 350, 550, 750 from BP Chemicals, Polyether LB® 25, LB® 30, LB® 34, LB® 40 from Bayer AG, polyethylene-propylene glycols such as Carbowax® 300, 400, 1000, 2000, 6000 from Union Carbide, di- or monofunctional polyether amines such as Jeffamine® ED600, ED900, ED4000, M715, M1000, M2070 from Texaco.

Nonionic monofunctional components c) having a molecular weight from 1000 to 2500 containing 10 to 57% incorporated propylene oxide and 90 to 43% incorporated ethylene oxide are used in preference.

A mixed hydrophilic agent is used in particular preference composed of nonionic hydrophilic component c) in quantities from 2 to 8 wt. %, wherein the ethylene oxide content is not more than 4.5 wt. % and anionic components c) with sulfonate groups or carboxylate groups from the reaction product of isophorone diamine and acrylic acid in quantities of 0.5 to 7 wt. %. This leads to sizes with excellent stability, very good adhesion properties and good reinforcing properties.

Component d) is at least one, preferably at least two mono-, di or polyfunctional compounds different from a) b) and c) having a molecular weight from 32 to 500 with primary or secondary amino and/or or hydroxyl groups. Suitable examples include ethylene diamine, diethylene triamine, isophorone diamine, hexamethylene diamine, 4,4-diaminodicyclohexylmethane, hydroxyethylethylene diamine, ethanolamine, diethanolamine, isopropanolamine, diisopropanolamine, N-methylethanolamine, aminomethylpropanol, hydrazine (hydrate), propylene diamine, dimethylethylene diamine, ethylene glycol, 1,2-, 1,3-propylene glycol, butane 1,4-diol, neopentyl glycol, hexane 1,6-diol, trimethylpentane diol, trimethylolpropane, glycerine, hydroxyethylacrylate, hydroxyethylmethacrylate, hydroxypropylacrylate, hydroxypropylmethacrylate, 3-aminopropyltriethoxysilane, 3-aminopropyl-trimethoxysilane, 3-aminopropyltributoxysilane, aminoethylaminopropyl-trimethoxysilane, reaction products of maleic acid dimethyl ester, maleic acid diethyl ester, and/or maleic acid dibutyl ester with the above-mentioned aminoalkoxysilanes, reaction product of (meth)acrylic acid and the glycidyl ester of versatic acid (Cardura E10, Shell), reaction product of 2 mole of propylene carbonate and 1 mole of hydrazine, adipic acid dihydrazide and/or mixtures of the above-mentioned, optionally with further components d). The components d) are used preferably in quantities from 2 to 8.5 wt. %.

By means of a suitable choice of component d) the molecular weight structure can be influenced by chain extension, chain branching and/or chain termination, and/or functional groups may be introduced. If components e) are used to prepare the prepolymer, hydroxyfunctional components d) of the type mentioned are used in preference. If components d) are used in organic solution or in aqueous dispersion for chain extension of the prepolymer, di- and/or trifunctional amine components d) are used in preference.

In a particularly preferred embodiment, the chain extender used is 0.1 to 1.2 wt. % of hydrazine or an equivalent quantity of hydrazine hydrate.

Monoaminofunctional alkoxysilanes such as, e.g., 3-aminopropyltriethoxysilane or 3-aminopropyltrimethoxysilane are used preferably for chain termination reactions, preferably in quantities of 0.5 to 3 wt. %.

The content of free hydroxyl and/or amino groups available for crosslinking may be adjusted by means of a suitable choice of component d).

To this end, e.g., aminoalcohols are used, particularly preferably diethanolamine, diisopropanolamine, ethanolamine and/or hydroxyethylethylene diamine and diamines such as, e.g., isophorone diamine. The amount (the excess) of component d) is preferably chosen such that only amino groups are allowed to react wholly or partially with isocyanate groups, and excess amino groups or preferably excess hydroxyl groups remain after the reaction has ended.

Suitable monofunctional blocking agents e) may be, e.g., butanone oxime, cyclohexanone oxime, acetone oxime, malonic ester, triazole, ε-caprolactam, phenol, dimethylpyrazole, monofunctional amines such as, e.g., dibutylamine, diisopropylamine, monofunctional alcohols such as, e.g., butanol, cyclohexanol, isopropanol, tert.-butanol. Mixtures of different blocking agents may also be used, particularly mixtures of blocking agents which deblock at different temperatures and, according to a preferred embodiment, permit a stepwise reaction.

Preferred blocking agents are butanone oxime, ε-caprolactam, dimethylpyrazole and alcohols or mixtures of said blocking agents.

The dispersions may additionally contain up to 10, preferably up to 6 wt. % of a reactive component F). Said component may be added at any time during the preparation of the products according to the invention, but only when no more free NCO groups are present. Suitable components F) may be, e.g., at least difunctional amines, polyamines or arninoalcohols. Preferably linear aliphatic or particularly preferably cycloaliphatic diamines are used. Possible components F) are hexamethylene diamine, isophorone diamine, dimethylethylene diamine, 1,4-cyclohexane diamine, trimethylhexane diamine, dimethylhexane diamine, Jeffamine® (Texaco) such as, e.g., 3,3'-[1,4-butanediyl-bis(oxy)]bis-1-propanamine, 4,4'-methylene-bis-(2,6-diethylcyclohexanamine), 4,4'-methylene-bis-(2-methylcyclohexanamine), 4,4'-methylene-bis-cyclohexanamine, TCD-diamine. The molecular weight of component F) is 60 to 1000, preferably 89 to 500.

In a preferred embodiment, the dispersions according to the invention contain, in addition to blocked isocyanate groups, 1 to 6 wt. % of aminofunctional components F) as the component bearing reactive groups.

In a further preferred embodiment, the dispersions according to the invention contain, in addition to blocked isocyanate groups, hydroxyl groups incorporated exclusively in the polymer, as reactive groups.

In a further preferred embodiment, the dispersions according to the invention contain, in addition to blocked isocyanate groups, both aminofunctional components F) and hydroxyl groups incorporated in the polymer as reactive groups or components bearing reactive groups.

In a further preferred embodiment, the dispersions according to the invention contain various blocked isocyanate groups, the isocyanate groups deblocking at different temperatures and thus contributing to a good bond of glass fibre to the size and in the second stage contributing to a good bond between size and plastic.

One such possible combination is the use of 20 to 80 wt. % of butanone oxime or dimethylpyrazole together with 80 to 20 wt. % of ε-caprolactam or monofunctional alcohols, the percentage details being based on the total quantity of blocking agent e).

The ratio of blocked NCO groups to free reactive hydroxyl and/or amino groups from component d) and/or component F) in the dispersions according to the invention is 1.00:0.25 to 1.00:1.35, preferably 1.00:0.35 to 1.00:0.85 and more particularly preferably 1.00:0.42 to 1.00:0.58.

The self-crosslinking dispersions according to the invention exhibit a storage stability that meets practical requirements at room temperature up to 50° C. After application, crosslinking takes place at temperatures from 80 to 280° C., preferably 110 to 220° C. The time required for the crosslinking reaction may be between 20 seconds and 45 minutes, and is preferably 1 to 20 minutes.

The reaction of components a) and b), optionally with the use of c) and/or a hydroxyfunctional component d) may take place in one or more stages. The reaction may be carried out in bulk or in organic solvents, in which case preferably in acetone. The equivalent ratio of the OH-functional components a) and optionally c) and/or d) to the NCO-functional component b) is chosen such that an NCO excess of 20 to 200, preferably 30 to 150% is obtained. Optionally, solvent is added to the NCO-functional prepolymer thus obtained in the first instance and then a part of the remaining NCO groups are reacted with component e). Said reaction takes place preferably at temperatures from 30 to 110, more particularly preferably at 30 to 80° C. The other NCO groups are reacted either before dispersion, in which case in an acetone solution, or during or after dispersion with an aminofunctional component c) and/or an amino- or hydroxyaminofunctional component e) in such a way that up to 4.0 wt. %, based on the solid of the polymer, of excess amino- and/or hydroxyl groups are present.

The solvent is then optionally removed by distillation. The hydrophilic component c) is used in quantities such that stable dispersions are obtained, a nonionic-hydrophilic component c) always being used too. If hydrophilic components are incorporated in the prepolymer, hydroxyfunctional ionic and/or nonionic hydrophilic agents are used in preference. The use of aminofunctional hydrophilic agents takes place preferably in the presence of a solvent and after prepolymer preparation, e.g., in the chain extension step before, during or after dispersion.

In one variant of the process, the reaction of components a) and b) takes place in the first instance, optionally with the use of c) and/or a hydroxyfunctional component d), in one or more stages. The reaction may be carried out in bulk or in organic solvents, in which case preferably in acetone. The equivalent ratio of the OH-functional components a) and optionally c) and/or d) to the NCO-functional component b) is chosen such that an NCO excess of 20 to 200, preferably 30 to 150% is obtained. Optionally, solvent is added to the NCO-functional prepolymer thus prepared in the first instance and then a part of the remaining NCO groups is reacted with component e). Said reaction takes place preferably at temperatures from 30 to 110, more particularly preferably at 30 to 80° C. The other NCO groups are reacted either before dispersion, in which case in an acetone solution, or during or after dispersion with an aminofunctional component c) and/or an amino- or hydroxyamino-functional component e) such that optionally excess amino- and/or hydroxyl groups are present in a quantity of up to 4.0 wt. %, based on the solid of the polymer. The addition of the reactive component F) in a quantity of up to 10, preferably up to 6 wt. % based on the solids content of the dispersion takes place at any time during preparation but only when no more free NCO groups are present.

The solvent is then optionally removed by distillation. The hydrophilic component c) is used in quantities such that stable dispersions are obtained, a nonionic-hydrophilic component c) always being used too. If hydrophilic components are incorporated in the prepolymer, hydroxyfunctional ionic and/or nonionic hydrophilic agents are used in preference.

The use of aminofunctional hydrophilic agents takes place preferably in the presence of a solvent and after prepolymer preparation, e.g., in the chain extension step before, during or after dispersion.

The reaction of the components may be carried out with the addition of catalysts such as, e.g., dibutyltin dilaurate, tin-2-octoate, dibutyltin oxide or diazabicyclononane.

Amines may be used to convert the acid groups to salt groups, for example tri-ethylamine, N-methylmorpholine, diisopropylamine, hydroxyamines such as di-ethanolamine, triethanolamine, diisopropanolamine, aminomethylpropanol, potassium or sodium hydroxide, ammonia and di- or polyamines such as hexamethylene diamine, isophorone diamine, dimethylethylene diamine, 1,4-cyclohexane diamine, trimethylhexane diamine, dimethylhexane diamine, Jeffamine® (Texaco) such as, e.g., 3,3'-[1,4-butanediyl-bis(oxy)]bis-1-propanamine, 4,4'-methylene-bis-(2,6-di-ethylcyclohexanamine), 4,4'-methylene-bis-(2-methyl-cyclohexanamine), 4,4'-methylene-bis-cyclohexanamine. The component F) described above with its free primary and/or secondary amino groups may also act as a neutralising agent for incorporated acid groups. This is preferred in the case of mixed hydrophilic agents.

The degrees of neutralisation are generally between 40 and 120%.

After dispersion in/by water, stirring is carried out until all the NCO groups have reacted with component b) and/or d) due to NCO-water reaction and/or chain extension reaction. A complete reaction of all the NCO groups with the above-mentioned OH or NH-functional components prior to dispersion in/with water is also possible.

The solvents optionally used for the preparation of the dispersion may be separated partially or preferably wholly from the dispersion by distillation. In particular preference, the dispersions contain less than 2 wt. % of volatile solvents and neutralising agents. Preferred solvents are acetone and N-methylpyrrolidone.

Auxiliary substances and additives such as anti-settling agents, defoamers, thickeners, emulsifiers, catalysts, flow control agents, adhesion promoters, biocides, antistatic agents, light stabilisers, lubricants, heat stabilisers etc. but also special oligomer or polymer compounds without hydrophilic groups may also be added to the polymers before, during or after dispersion.

The dispersions according to the invention have average particle diameters (determined, e.g., by laser correlation spectroscopy) of 20 to 900, preferably 50 to 400 nm.

The solids contents of the dispersions are at least 30, preferably at least 35% at viscosities of 10 to 150 seconds flow time (DIN-4 beaker, 23° C.). The pH values are preferably between 5.0 and 11.0.

The self-crosslinking dispersions according to the invention are particularly suitable for use in or as sizes, preferably glass fibre sizes. The dispersions may be used as the sole binder or together with other polymers such as, e.g., polyurethane dispersions, polyacrylate dispersions, polyester dispersions, polyether dispersions, polyepoxide dispersions, polyvinylester or polyvinylether dispersions, polystyrene or polyacrylonitrile dispersions, blocked polyisocyanates, blocked polyisocyanate dispersions, amino crosslinking resins such as, e.g., melamine resins.

The self-crosslinking dispersions according to the invention or the sizes prepared therefrom may contain the conventional auxiliary substances and additives such as, e.g., defoamers, thickeners, flow control agents, dispersing aids, catalysts, anti-skinning agents, anti-settling agents, emulsifiers, biocides, adhesion promoters, e.g., based on the well known low or high molecular weight silanes, lubricants, wetting agents, antistatic agents.

The sizes may be applied by any methods, for example, using suitable devices such as, e.g., spray or roller applicators. They may be applied onto glass filaments drawn at high speed from spinning nozzles immediately after the solidification thereof, i.e. before winding. It is also possible to size the fibres in a dipping bath after the spinning process. The sized glass fibres may be further processed either wet or dry, for example, to chopped glass. The drying of the end product or intermediate product takes place at temperatures from 100 to 200° C. The term drying means not only the removal of other volatile constituents but, e.g., also the solidification of the size constituents. The proportion of size, based on the sized glass fibres, is 0.1 to 4%, preferably 0.2 to 2 wt. %.

Matrix polymers used may be thermoplastic and thermosetting polymers.

The dispersions obtained according to the invention are also suitable for all fields of application in which solvent-containing, solvent-free or other types of aqueous coating systems with an increased range of properties are used, e.g., for coating mineral substrates, lacquering and sealing wood and wood materials, painting and coating metallic surfaces, painting and coating plastics and coating textiles and leather. The dispersions according to the invention may be used as base primer, anchor coat, primer, surfacer, paint, one-coat paint, top coat or finish in the form of clear coats or clear coatings or in pigmented form.

EXAMPLES

Example 1

1170 g of a difunctional polypropylene glycol with a molecular weight of 1000 g/mole, 135 g of Polyether LB25 (Bayer AG, monofunctional polyether based on ethylene oxide/propylene oxide, molecular weight 2245 g/mole) and 122.4 g of ethoxylated trimethylolpropane (molecular weight 306) are weighed into a 6 l reaction vessel with a stirring, cooling and heating apparatus and homogenised at 60° C. and then reacted with 759 g of isophorone diisocyanate until the theoretical NCO value has been obtained. 94.8 g of ϵ-caprolactam are then added to the NCO-functional polyurethane prepolymer and stirred at 80° C. until the theoretical NCO content is obtained, the mixture diluted with 1500 g of acetone and reacted with a 25% aqueous solution of 23.5 g of hydrazine and 125.3 g of the reaction product of 1 mole of acrylic acid and 1 mole of isophorone diamine until no more NCO groups can be detected by infrared spectroscopy. After the addition of 24 g of Irganox 245 (Ciba-Geigy), 44 g of 4,4'-methylene-bis-cyclohexanamine and 6 g of triethylamine are dispersed with 3000 g of water. After distillation of the acetone, a self-crosslinking dispersion is obtained which has a solids content of 43% and contains blocked NCO groups and a reactive diamine.

Example 2

1000 g of a difunctional polypropylene glycol with a molecular weight of 1000 g/mole, 152 g of Polyether LB25 (Bayer AG, monofunctional polyether based on ethylene oxide/propylene oxide, molecular weight 2245 g/mole) 69.4 g of a sodium sulfonate diol with a molecular weight of 432 g/mole and 107 g of trimethylol propane are weighed into a 6 l reaction vessel with a stirring, cooling and heating apparatus, melted at 70° C. and then reacted with 577 g of isophorone diisocyanate and 269 g of hexamethylene diisocyanate until the theoretical NCO value has been obtained. The NCO-functional polyurethane prepolymer is then diluted with 600 g of acetone and reacted with a 40% solution in acetone of 73 g of dimethylpyrazole, 51 g of hydrazine and 47 g of N-methylethanolamine. 30 minutes after the addition of the solution, a self-crosslinking dispersion is obtained by adding water, which dispersion has a solids content of 40% after distillation of the acetone and contains both blocked NCO groups and hydroxyl groups bound to the polymer.

Example 3

1775 g of a difunctional polycarbonate diol with a molecular weight of 2000 g/mole (Desmophen 2020, Bayer AG), 101 g of Polyether LB25 (Bayer AG, monofunctional polyether based on ethylene oxide/propylene oxide, molecular weight 2245 g/mole) are weighed into a 10 l reaction vessel with a stirring, cooling and heating apparatus, melted at 70° C. and then reacted with 254 g of isophorone diisocyanate and 192 g of hexamethylene diisocyanate until the theoretical NCO value has been obtained. The NCO-functional polyurethane prepolymer is then diluted with 3200 g of acetone and reacted with 35 g of butanone oxime until the theoretical NCO value is obtained. A mixture of 83 g of isophorone diamine, 4 g of hydrazine, 26 g of aminoethyl-aminoethane sulfonic acid in the form of the sodium salt, 23.5 g of hydroxy-ethylethylene diamine and 260 g of water is then added in 2 minutes. 15 minutes after the addition of the solution, a self-crosslinking dispersion is obtained by adding 3300 g of water, which dispersion has a solids content of 40% after distillation of the acetone, and contains both blocked NCO groups and hydroxyl groups bound to the polymer.

Example 4

1600 g of a difunctional tetrahydrofuran polyether with a molecular weight of 2000 g/mole, 800 g of a tetrahydrofuran polyether with a molecular weight of 1000, 224 g of Polyether LB25 (Bayer AG, monofunctional polyether based on ethylene oxide/propylene oxide, molecular weight 2245 g/mole), 270 g of butane diol and 302 g of a sodium sulfonate diol with a molecular weight of 432 g/mole are weighed into a 6 l reaction vessel with a stirring, cooling and heating apparatus, homogenised at 70° C., 1332 g of isophorone diisocyanate and 655 g of hexamethylene diisocyanate are added and the mixture reacted at 100° C. until the theoretical NCO value has been obtained. The NCO-functional polyurethane prepolymer is reacted at 75° C. with 78 g of butanone oxime (dissolved in 55 g of N-methylpyrrolidone) until the theoretical NCO value is obtained. The mixture is then dispersed within 10 minutes in 8000 g of water heated to 45° C. and then a mixture of 168 g of ethylene diamine, 22 g of hydrazine, 24 g of ethanolamine and 200 g of water is added in 5 minutes. After 3 hours' stirring at 45° C., no more free NCO groups can be detected and 51 g of isophorone diamine are then added. A self-crosslinking dispersion is obtained with a solids content of 40%, which contains blocked NCO groups and free hydroxyl groups bound to the polymer, and a reactive diamine.

Using the dispersions 1 to 4) according to the invention, the conventional auxiliaries, i.a. a lubricant and 3-aminopropyltriethoxysilane as adhesion promoter (10% based on the amount of dispersion used), glass fibres were prepared in the usual and known way, sized, chopped and dried. The glass fibres were compounded in Polyamide 6.6 for reinforcement.

The processing properties of the sizes based on the dispersions according to the invention were very good. No problems at all occurred with the formation of specks or precipitation during use, and the storage stability was excellent. The bulk volume of the coated and comminuted glass fibres was deemed to be relatively low, and hence good. The size content was 1.2 to 1.6%.

The mechanical values of the test specimens prepared therefrom were high. The tensile strengths (DIN 53455) were from 190 to 201 MPa, the flexural strengths (DIN 53457) were from 280 to 305 MPa, the impact resistance values (DIN ISO 180) were between 61.5 and 65 $KJ/m^2$.

The test specimens underwent a hydrolysis test at 110° C. in a water/ethylene glycol/propylene glycol mixture. The flexural strength was tested at 2 week intervals. After 2 weeks the flexural strength was still about 145 MPa on average, after 4 weeks still about 135 MPa on average, and after 6 weeks still about 125 MPa. These values are to be regarded as good.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A self-crosslinking dispersion prepared from one of a polyurethane, a polyurethane-polyurea and a polyurea comprising the dispersed or dissolved reaction product of a) at least one polyol component, b) at least one di-, tri- and/or polyisocyanate component, c) at least one hydrophilic, nonionic or (potentially) ionic structural component selected from the group consisting of compounds with at least one group which is reactive towards isocyanate groups and at least one hydrophilic polyether chain and compounds with at least one group capable of salt formation optionally present at least in the partially neutralized form, and at least one group which is reactive towards isocyanate groups, d) at least one structural component which differs from a), b) and c) having a molecular weight from 32 to 500 and at least one group which is reactive towards isocyanate groups, and e) at least one monofunctional blocking agent, wherein component c) is present in sufficient quantity to provide a stable dispersion, and wherein component d) is present in sufficient amount such that the resulting dispersion contains, in addition to blocked isocyanate groups, reactive free hydroxyl and/or amino groups, and wherein the amount of reactive hydroxyl or amino groups from component d) must be greater than zero.

2. The dispersion of claim 1, wherein the reaction product comprises 30 to 90 wt. % of component a) having a hydroxyl value from 5 to 350, 10 to 50 wt. % of component b), 1 to 20 wt. % of component c), 1 to 20 wt. % of component d), 0.2 to 7.5 wt. % of component e), wherein the dispersion contains component d) in an amount such that the reactive free hydroxyl and/or amino groups comprise up to 4 wt. % based on the solids content of the dispersion.

3. The dispersion of claim 1, wherein the reaction product comprises a) 35 to 75 wt. % of component a), b) 15 to 40 wt. % of at least one diisocyanate component, c) 2.5 to 15 wt. % of the hydrophilic nonionic compound and also the (potentially) anionic compound with a group capable of salt formation and at least one group which is reactive towards isocyanate groups, d) 1 to 11 wt. % of component d), and e) 0.2 to 6 wt. % of component e), wherein the sum of components a) to e) is 100%, and wherein the dispersion contains component d) in an amount such that the reactive free hydroxyl and/or amino groups comprise up to 2.5 wt. % based on the solids content of the dispersion.

4. The dispersion of claim 3 wherein the reaction product comprises a) 37 to 49 wt. % of at least one polyol component having a hydroxyl value from 8 to 200, b) 15 to 40 wt. % of isophorone diisocyanate and/or hexamethylene diisocyanate, c) 2.5 to 15 wt. % of at least one hydrophilic, nonionic compound with a group which is reactive towards isocyanate groups and a hydrophilic polyether chain and also a (potentially) anionic compound with a group capable of salt formation and optionally present at least in the partially neutralized form, and at least one group which is reactive towards isocyanate groups, d) 2 to 8.5 wt. % of at least two structural components different from components a), b) and c) having a molecular weight from 32 to 500 and at least one group which is reactive towards isocyanate groups, and e) 0.2 to 6 wt. % of at least one blocking agent, wherein the sum of components a) to e) is 100%, wherein component c) is present in sufficient quantity to provide a stable dispersion and wherein component d) is present in sufficient amount such that the resulting dispersion contains, in addition to blocked isocyanate groups, reactive free hydroxyl and/or amino groups in quantities from 0 to 2.5 wt. % based on the solids content of the dispersion, and wherein the proportion of reactive hydroxyl or amino groups from component d) must be greater than zero.

5. A self-crosslinking dispersion prepared from one of a polyurethane, a polyurethane-polyurea and a polyurea comprising the dispersed or dissolved reaction product of a) 35 to 75 wt. % of at least one polyol component, b) 15 to 40 wt. % of at least one diisocyanate component, c) 2 to 8 wt. % of a nonionic hydrophilic compound , having an ethylene oxide content of not more than 4.5 wt. %, and 0.5 to 7 wt. %. of an anionic compound, d) 1 to 11 wt. % of component d), and e) 0.2 to 6 wt. % of component e), wherein the sum of components a) to e) is 100%, and wherein the dispersion contains component d) in an amount such that the reactive free hydroxyl and/or amino groups comprise up to 2.5 wt. % based on the solids content of the dispersion.

6. A self-crosslinking dispersion prepared from one of a polyurethane, a polyurethane-polyurea and a polyurea comprising the dispersed or dissolved reaction product of a) at least one member selected from the group consisting of polycarbonate diols, polytetrahydrofuran diols and/or di- or trifunctional polypropylene glycols having a molecular weight from 300 to 3500, wherein a maximum of 8% of trifunctional polyols are contained, based on the total solids content, b) at least one di-, tri- and/or polyisocyanate component, c) at least one hydrophilic, nonionic or (potentially) ionic structural component selected from the group consisting of compounds with at least one group which is reactive towards isocyanate groups and at least one hydrophilic polyether chain and compounds with at least one group capable of salt formation optionally present at least in the partially neutralized form, and at least one group which is reactive towards isocyanate groups, d) at least one structural component which differs from a), b) and c) having a molecular weight from 32 to 500 and at least one group which is reactive towards isocyanate groups, and e) at least one monofunctional blocking agent, wherein component c) is present in sufficient quantity to provide a stable dispersion, and wherein component d) is present in sufficient amount such that the resulting dispersion contains, in addition to blocked isocyanate groups, reactive free hydroxyl and/or amino groups, wherein the amount of reactive hydroxyl or amino groups from component d) must be greater than zero.

7. The dispersion of claim 1, wherein component b) consists of an aliphatic and/or a cycloaliphatic diisocyanate having a molecular weight from 168 to 262.

8. The dispersion of claim 1, wherein component d) comprises up to 3 wt. % of a monoaminofunctional alkoxsilane.

9. The dispersion of claim 1, wherein component e) comprises a mixture of blocking agents with different reactivities.

10. A self-crosslinking disperse on prepared from one of a polyurethane, a polyurethane-polyurea and a polyurea comprising the dispersed or dissolved reaction product of a) at least one polyol component, b) at least one di-, tri- and/or polyisocyanate component, c) at least one hydrophilic, nonionic or (potentially) ionic structural component selected from the group consisting of compounds with at least one group which is reactive towards isocyanate groups and at least one hydrophilic polyether chain and compounds with at least one group capable of salt formation optionally present at least in the partially neutralized form, and at least one group which is reactive towards isocyanate groups, d) at least one structural component which differs from a), b) and c) having a molecular weight from 32 to 500 and at least one group which is reactive towards isocyanate groups, and e) at least one monofunctional blocking agent, wherein component c) is present in sufficient quantity to provide a stable dispersion, wherein component d) comprises hydroxyl groups which are introduced through the use of at least one hydroxyamine and is present in sufficient amount such that the resulting dispersion contains, in addition to blocked isocyanate groups, reactive free hydroxyl and/or amino groups, wherein the amount of reactive hydroxyl or amino groups from component d) must be greater than zero.

11. The dispersion of claim 1 wherein component F) comprises 1 to 6 wt. %, based on the solids content of the dispersion, of at least one reactive aliphatic and/or cycloaliphatic diamine.

12. A self-crosslinking dispersion prepared from one of a polyurethane, a polyurethane-polyurea and a polyurea comprising the dispersed or dissolved reaction product of a) at least one polyol component, b) at least one di-, tri- and/or polyisocyanate component, c) at least one hydrophilic, nonionic or (potentially) ionic structural component selected from the group consisting of compounds with at least one group which is reactive towards isocyanate groups and at least one hydrophilic polyether chain and compounds with at least one group capable of salt formation optionally present at least in the partially neutralized form, and at least one group which is reactive towards isocyanate groups, d) at least one structural component which differs from a), b) and c) having a molecular weight from 32 to 500 and at least one group which is reactive towards isocyanate groups, and e) at least one monofunctional blocking agent, wherein component c) is present in sufficient quantity to provide a stable dispersion, and wherein component d) is present in sufficient amount such that the resulting dispersion contains, in addition to blocked isocyanate groups, reactive free hydroxyl and/or amino groups, wherein the amount of reactive hydroxyl or amino groups from component d) must be greater than zero and wherein the ratio of all the blocked isocyanate groups to free reactive hydroxyl and/or amino groups is 1.00:0.35 to 1.00:0.85.

13. The dispersion of claim 2, wherein the group capable of salt formation comprises a sulfonate group.

14. The dispersion of claim 3, wherein at least 75% of the compound with at least one group capable of salt formation comprises the reaction product of equivalent amounts of isophorone diamine and acrylic acid.

15. The dispersion of claim 1 wherein component d) comprises 0.1 to 1.2 wt. % of hydrazine or an equivalent amount of hydrazine hydrate as chain extender.

16. The dispersion of claim 1 wherein component F) acts as a neutralizing agent for acid groups bound to the polymer.

17. A process for preparing the self-crosslinking dispersion comprising preparing an isocyanate-functional prepolymer from at least one polyol a), at least one isocyanate component b), a hydrophilic component c) or a component d), reacting a portion of the isocyanate groups with at least one blocking agent e), and reacting the remaining isocyanate groups with hydrophilic component c) and/or component d),wherein the hydrophilic component c) is present in sufficient quantity to provide a stable dispersion and wherein component d) is present in sufficient amount such a way that, in addition to blocked isocyanate groups, free reactive hydroxyl and/or amino groups are bound to the polymer In the self-crosslinking dispersion, wherein said dispersion is storage-stable at room temperature to 50° C. and reacts at 90 to 280° C. with crosslinking.

18. The process for the preparation of the self-crosslinking dispersion comprising preparing an isocyanate-functional prepolymer in a first step from at least one polyol a), at least one isocyanate component b), optionally with the use of a hydrophilic component c) or a component d), reacting a part of the remaining isocyanate groups with at least one blocking agent e), and optionally reacting the other isocyanate groups either before, during or after the dispersion with hydrophilic components c) and/or components d), so that, in addition to blocked isocyanate groups, optionally free reactive hydroxyl and/or amino groups are bound to the polymer in the self-crosslinking dispersion, wherein said dispersion is storage-stable at room temperature to 50° C. and reacts at 90 to 280° C. with crosslinking.

19. A process of sizing a glass fiber comprising contacting a glass fiber with an effective amount of the self-crosslinking dispersion prepared from one of a polyurethane, a polyurethane-polyurea and a polyurea, the polymer having bound thereto blocked isocyanate groups and reactive hydroxyl or amino groups, wherein the dispersion is storage-stable at room temperature to 50° C. and reacts at 90 to 280° C. with crosslinking.

20. A glass fiber size comprising the self-crosslinking dispersion prepared from one of a polyurethane, a polyurethane-polyurea and a polyurea, the polymer having bound thereto blocked isocyanate groups and reactive hydroxyl or amino groups, wherein the dispersion is storage-stable at room temperature to 50° C. and reacts at 90 to 280° C. with crosslinking.

* * * * *